US009135049B2

(12) United States Patent
Mizrahi et al.

(10) Patent No.: US 9,135,049 B2
(45) Date of Patent: Sep. 15, 2015

(54) PERFORMING THIN-PROVISIONING OPERATIONS ON VIRTUAL DISK IMAGES USING NATIVE FEATURES OF THE STORAGE DOMAIN

(71) Applicant: Red Hat Israel, Ltd., Raanana (IL)

(72) Inventors: Saggi Y. Mizrahi, Fierberg (IL); Ayal Baron, Kiryat Ono (IL)

(73) Assignee: Red Hat Israel, Ltd., Raanana (IL)

( * ) Notice: Subject to any disclaimer, the term of this patent is extended or adjusted under 35 U.S.C. 154(b) by 252 days.

(21) Appl. No.: 13/653,146

(22) Filed: Oct. 16, 2012

(65) Prior Publication Data

US 2014/0109086 A1   Apr. 17, 2014

(51) Int. Cl.
G06F 9/455 (2006.01)
G06F 17/30 (2006.01)
G06F 3/06 (2006.01)
H04L 29/08 (2006.01)

(52) U.S. Cl.
CPC .............. *G06F 9/45558* (2013.01); *G06F 3/06* (2013.01); *G06F 17/30* (2013.01); *G06F 2009/45579* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 8,346,727 B1 * | 1/2013 | Chester et al. | 707/640 |
| 8,726,273 B2 * | 5/2014 | Le | 718/1 |
| 8,881,144 B1 * | 11/2014 | Banerjee et al. | 718/1 |
| 2005/0149712 A1 * | 7/2005 | Martinez et al. | 713/1 |
| 2006/0026591 A1 * | 2/2006 | Backhouse et al. | 717/177 |
| 2006/0064441 A1 * | 3/2006 | Yamamoto | 707/201 |
| 2007/0192374 A1 * | 8/2007 | Abnous et al. | 707/200 |
| 2007/0220502 A1 * | 9/2007 | Asselin et al. | 717/163 |
| 2007/0240134 A1 * | 10/2007 | Buragohain et al. | 717/140 |
| 2009/0271518 A1 * | 10/2009 | Manchanda et al. | 709/227 |
| 2010/0107097 A1 * | 4/2010 | Ferlitsch | 715/764 |
| 2011/0252038 A1 * | 10/2011 | Schmidt et al. | 707/741 |
| 2012/0017114 A1 * | 1/2012 | Timashev et al. | 714/15 |
| 2012/0167080 A1 * | 6/2012 | Vilayannur et al. | 718/1 |
| 2013/0036418 A1 * | 2/2013 | Yadappanavar et al. | 718/1 |
| 2013/0198459 A1 * | 8/2013 | Joshi et al. | 711/130 |
| 2013/0227558 A1 * | 8/2013 | Du et al. | 718/1 |
| 2013/0282662 A1 * | 10/2013 | Kumarasamy et al. | 707/649 |
| 2014/0089921 A1 * | 3/2014 | Yang et al. | 718/1 |

* cited by examiner

*Primary Examiner* — Emerson Puente
*Assistant Examiner* — Benjamin Wu
(74) *Attorney, Agent, or Firm* — Lowenstein Sandler LLP

(57) ABSTRACT

A virtual disk image manager running on a computing device determines that an operation is to be performed on a virtual disk image. The virtual disk image manager then determines whether an underlying storage domain on which the virtual disk image is stored supports the operation. In response to determining that the storage domain supports the operation, the virtual disk image manager uses native capabilities of the storage domain to perform the operation. In response to determining that the storage domain does not support the operation, the virtual disk image manager performs the operation without the use of the storage domains native capabilities.

20 Claims, 7 Drawing Sheets

PERFORMING THIN-PROVISIONING OPERATIONS ON VIRTUAL DISK IMAGES USING NATIVE FEATURES OF THE STORAGE DOMAIN

TECHNICAL FIELD

Embodiments of the present invention relate to storage management, and more specifically to storage management of virtual disk images for virtual machines.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM). The hypervisor emulates the underlying hardware of the host machine, making the use of the virtual machine transparent to the guest operating system and to any users.

Virtual machines can be provided by a single host having its own dedicated storage or by a cluster of hosts that share a pool of storage. Some conventional systems install a dedicated file system that is optimized for managing disk images onto storage device. This dedicated file system may then perform all storage related operations for a hypervisor. However, reliance on such dedicated file systems may minimize an administrator's options for designing a virtualization system.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
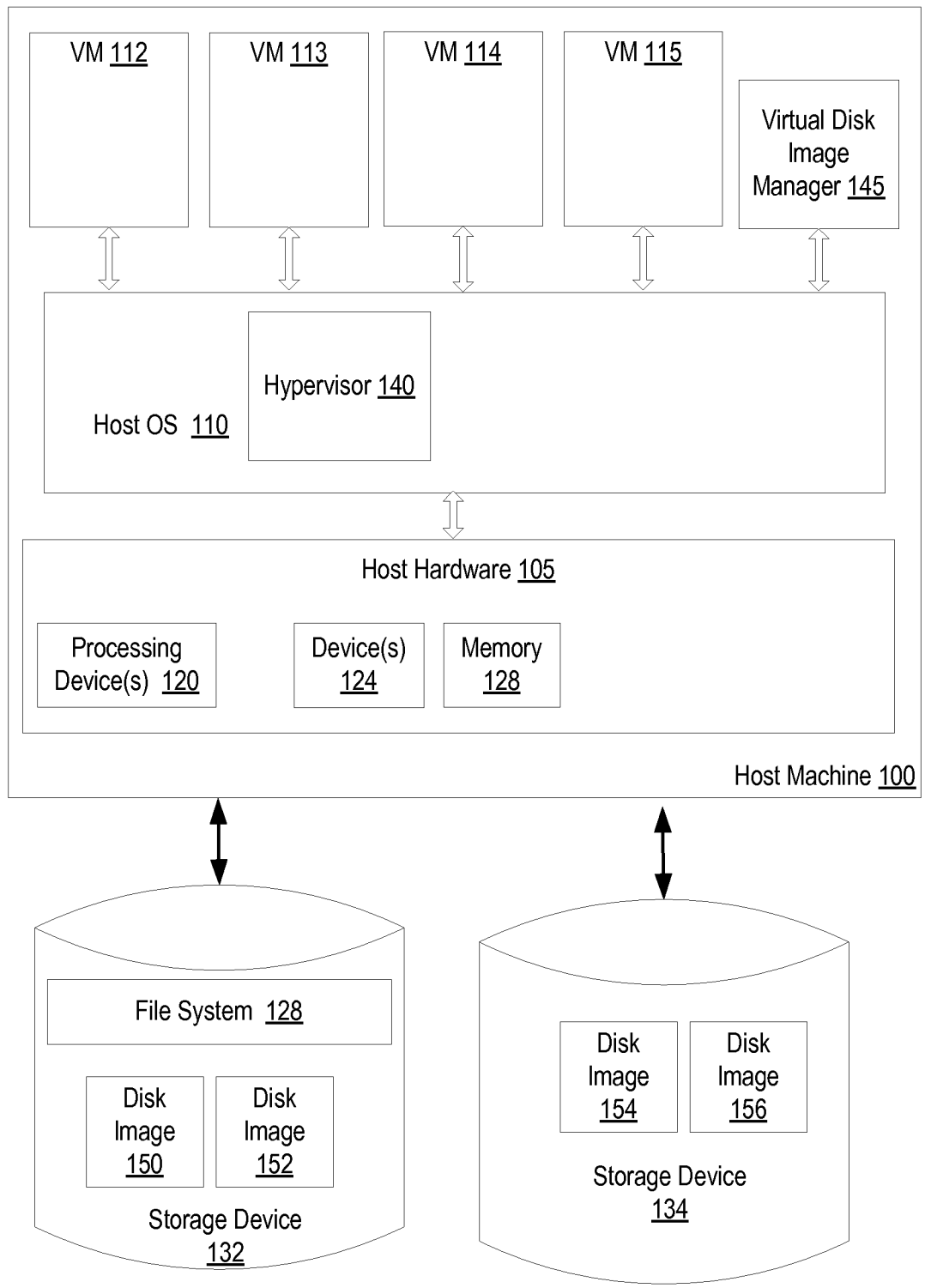
FIG. 1 is a block diagram that illustrates an embodiment of a computer system that hosts one or more virtual machines.

Described herein is a method and system for managing virtual disk images. The virtual disk images may be stored in any type of storage domain, including block device storage domains and file system storage domains. A virtual disk image manager may include different plugins (or alternatively addons or extensions) for each of the different types of possible storage domains that the virtual disk image manager may interface with. Each plugin may identify what capabilities are supported by the storage domain associated with that plugin. For example, the virtual disk image manager may include a common internet file system (CIFS) file system plugin for managing virtual disk images over the CIFS file system, a network file system (NFS) file system plugin for managing virtual disk images over the NFS file system, an internet small computer system interface (iSCSI) block device plugin for managing virtual disk images on a block device using the iSCSI protocol, and so forth.

The virtual disk image manager may act as an interface to underlying storage domains. A hypervisor may generate commands to perform operations on a virtual disk image stored on a storage domain, which may be intercepted by (or sent to) the virtual disk image manager. The virtual disk image manager may then determine a storage type for the storage domain, and may determine whether storage domains having that storage type natively support the requested operations. If the storage domain supports the operations, then the virtual disk image manager uses the native capabilities of the storage domain to perform the operations. However, if the storage domain does not natively support the operations, then the virtual disk image manager performs these operations using higher level software (e.g., at the application level).

The virtual disk image manager enables disk images to be stored on any type of storage domain. If the storage domain does not provide capabilities traditionally used by virtual disk images, then these capabilities are offered by the virtual disk image manager. Thus, administrators can choose any storage domains that they like for an underlying backend data store. Additionally, multiple types of storage backends may be used to store virtual disk images in parallel. To manage virtual disk images over a particular storage type, an administrator may merely install a new plugin for that storage type to the virtual disk image manager. This enables an administrator to provision storage to virtual machines in a standard way, regardless of an underlying backend storage. Thus, administrators are not constrained to use any specific type of file system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a computer system (referred to herein as a host machine 100) that hosts one or more virtual machines (VMs) 112-115. The host machine 100 may be a rackmount server, a workstation, a desktop computer, a notebook computer, a tablet computer, a mobile phone, a palm-sized computing device, a personal digital assistant (PDA), etc. The host machine 100 includes host hardware 105, which includes one or more processing devices 120, multiple additional devices 124, memory 128, and other hardware components. The memory 128 may include volatile memory devices (e.g., random access memory (RAM)), non-volatile memory devices (e.g., flash memory), and/or other types of memory devices. The host machine 100 may be a single machine or multiple host machines arranged in a cluster.

Each of the devices 124 may be a physical device that is internal or external to the host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., a storage device 132), external I/O devices, etc.

The host hardware 105 may also be coupled to one or more storage devices 132 and 134 via a direct connection or a network. The storage devices 132, 134 may be internal storage devices or external storage devices. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS) as provided by Amazon® Simple Storage Service (S3®), Rackspace® Cloud Storage, etc.), and so forth.

Storage device 134 may be a block device that handles data at a block level. The block device may be accessible via small computer system interface (SCSI), internet small computer system interface (iSCSI), Fibre Channel Protocol (FCP), ATA over Ethernet (AoE), or other block I/O protocols. Storage device 132 may be a block device that includes an overlay of a file system 128 that handles data at a file level. The file system 128 may be, for example a network file system (NFS), a common internet file system (CIFS), a fourth extended file system (EXT4), an XFS file system, a hierarchical file system (HFS), a BTRFS file system, or other file system. Block devices traditionally do not support snapshots, sparseness (e.g., sparse files), thin provisioning, deduplication, clustered locking, or many other features that are beneficial for the management of virtual disk images. The capabilities of file systems varies widely, with some basic file systems such as the file allocation table (FAT) file system failing to support advanced features such as thin provisioning and clustered locking, and other file systems such as BTRFS supporting a full range of advanced features such as snapshots, pooling, checksums, clustered locking, and so forth.

Each of the storage devices 132, 134 may store a collection of virtual disk images 150, 152, 154, 156. The actual composition of the virtual disk images 150-156 on the storage devices 132, 134 may depend on a storage type for that storage device (e.g., whether or not it includes a file system, a type of file system, etc.). Additionally, how the disk images 150-156 are accessed, how they are updated, etc. may depend on the storage type of the storage devices 132, 134.

Each disk image 150-156 may be a single file, set of files or sequence of data (e.g., a contiguous or non-contiguous set of blocks in a block device) that contains the contents and structure representing a storage device such as a hard drive. Each virtual disk image 150-156 may contain all the information that defines a particular virtual machine 112-115 (described below). For example, disk image 150 may be used to execute virtual machine 112, disk image 152 may be used to execute virtual machine 113, disk image 154 may be used to execute virtual machine 114, and disk image 156 may be used to execute virtual machine 115. Once a virtual machine 112-115 is loaded and connected to its associated disk image 150-156, I/O operations that it performs may cause data to be read from and/or written to the associated disk image 150-156.

The host machine 100 includes a hypervisor 140 (also known as a virtual machine monitor (VMM)). In one embodiment (as shown) hypervisor 140 is a component of a host operating system 110. Alternatively, the hypervisor 140 may run on top of a host OS 110, or may run directly on host hardware 105 without the use of a host OS 110.

The hypervisor 140 manages system resources, including access to memory 128, devices 124, storage devices 132, 134, and so on. The hypervisor 140, though typically implemented in software, may emulate and export a bare machine interface (host hardware 105) to higher level software. Such higher level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 112-115, which may provide the same or different abstractions to various guest software (e.g., guest operating system, guest applications, etc.). Some examples of hypervisors include quick emulator (QEMU®), kernel mode virtual machine (KVM®), VMWare® Workstation, VirtualBox®, and Xen®.

The host machine 100 hosts any number of virtual machines (VM) 112-115 (e.g., a single VM, one hundred VMs, etc.). A virtual machine 112-115 is a combination of guest software that uses an underlying emulation of the host machine 100 (e.g., as provided by hypervisor 140). The guest software may include a guest operating system, guest applications, guest device drivers, etc. Virtual machines 112-115 can be, for example, hardware emulation, full virtualization, para-virtualization, and operating system-level virtualization virtual machines. The virtual machines 112-115 may have the same or different guest operating systems, such as Microsoft® Windows®, Linux®, Solaris®, etc.

Each VM 112-115 may be associated with a particular virtual disk image 150-156 or set of virtual disk images 150-156. These disk images 150-156 may appear to the virtual machine 112-115 as a contiguous block device, which may have a file system installed thereon. The guest operating system, guest applications, user data, and so forth may be included in one or more of the disk images 150-156. When a virtual machine 112-115 is to be loaded, virtual disk image manager 145 may provide hypervisor 140 with a path to a virtual disk image that contains the virtual machine. Hypervisor 140 may load the virtual machine from the disk image, and the loaded virtual machine may be connected to that disk image (e.g., to a particular area of storage on one or more storage devices 132, 134 that includes the disk image). This disk image 150-156 may appear to the virtual machine as a physical storage device. The virtual machine 112-115 may then perform standard I/O operations (e.g., read and write operations) on data within the virtual disk image 150-156 without the virtual disk image manager 145 becoming involved.

Virtual disk image manager 145, which may run on the host OS 110, may manage the virtual disk images 150-156. For virtual machines, an administrator typically desires high level virtualization capabilities, such as the capability to generate snapshots, implement locking strategies, implement copy-on-write capabilities, and so forth. However, many block devices and file systems do not support some or all of these capabilities. The virtual disk image manager 145 enables these high level virtualization concepts to be implemented over any block device or file system. Thus, the virtual disk image manager 145 provides an administrator with all of these capabilities, regardless of an underlying storage domain that is used to store the virtual disk images.

Virtual disk image manager 145 may manage a virtual disk image repository, which may be a directory structure that is used for storing disk images. In one embodiment, the image repository is a tree of dependent files that may or may not share data. Virtual disk image manager 145 may use any file system or block device and add higher level concepts such as virtual disk images and snapshots to the file system, regardless of the file system's or block device's native capabilities. The virtual disk image manager 145 may be transparent to the hypervisor 140 and to the virtual machines 112-115. Thus, the hypervisor 140 may attempt to access a particular disk image, and virtual disk image manager 145 may provide a path to a disk image or multiple paths to multiple disk images.

The virtual disk image manager 145 may handle the creating, deleting, modifying, moving, copying, and so forth of virtual disk images 150-156. Some storage and disk related commands that would ordinarily be sent to a storage device may instead be intercepted by or sent to the virtual disk image manager 145. Such commands may include commands to obtain locks on virtual disk images 150-156, commands to generate snapshots of disk images 150-156, and so forth. For example, once hypervisor 140 determines that a snapshot is to be made, that a disk image is to be copied, that a disk image is to be deleted, etc., the hypervisor 140 may send a command to perform the desired operation to the appropriate storage device 132, 134 or to the virtual disk image manager 145. The virtual disk image manager 145 may intercept the command and then determine whether to use native capabilities of the storage device 132, 134 to perform requested operations, or to perform the requested operations by the virtual disk image manager (e.g., if the requested operations are not supported by the storage device).

The virtual disk image manager 145 may additionally monitor virtual disk images 150-156 of running virtual machines 112-115, and may unilaterally determine to perform one or more operations on the disk images 150-156. For example, storage device 134 may not support thin provisioning or clustered locking. Virtual disk image manager 145 may automatically initiate a clustered locking application and request a lock on virtual disk image 154 for virtual machine 114 upon virtual machine 114 being loaded. Virtual disk image manager 145 may additionally monitor disk image 154 while VM 114 is running, and may automatically generate a command to storage device 134 to grow disk image 154 if disk image 154 is approaching its capacity.

Note that once a virtual machine 112-115 is connected to (e.g., has mounted) a particular area of storage, the virtual machine 112-115 may perform input/output (I/O) operations directly to that storage. Thus, the virtual disk image manager 145 may provide the arguments or information that a virtual disk image 112-115 uses to connect to an area of storage, but may not be part of the storage path. In other words, in one embodiment I/O communications such as reads and writes do not go through the virtual disk image manager 145.

Figure 2:
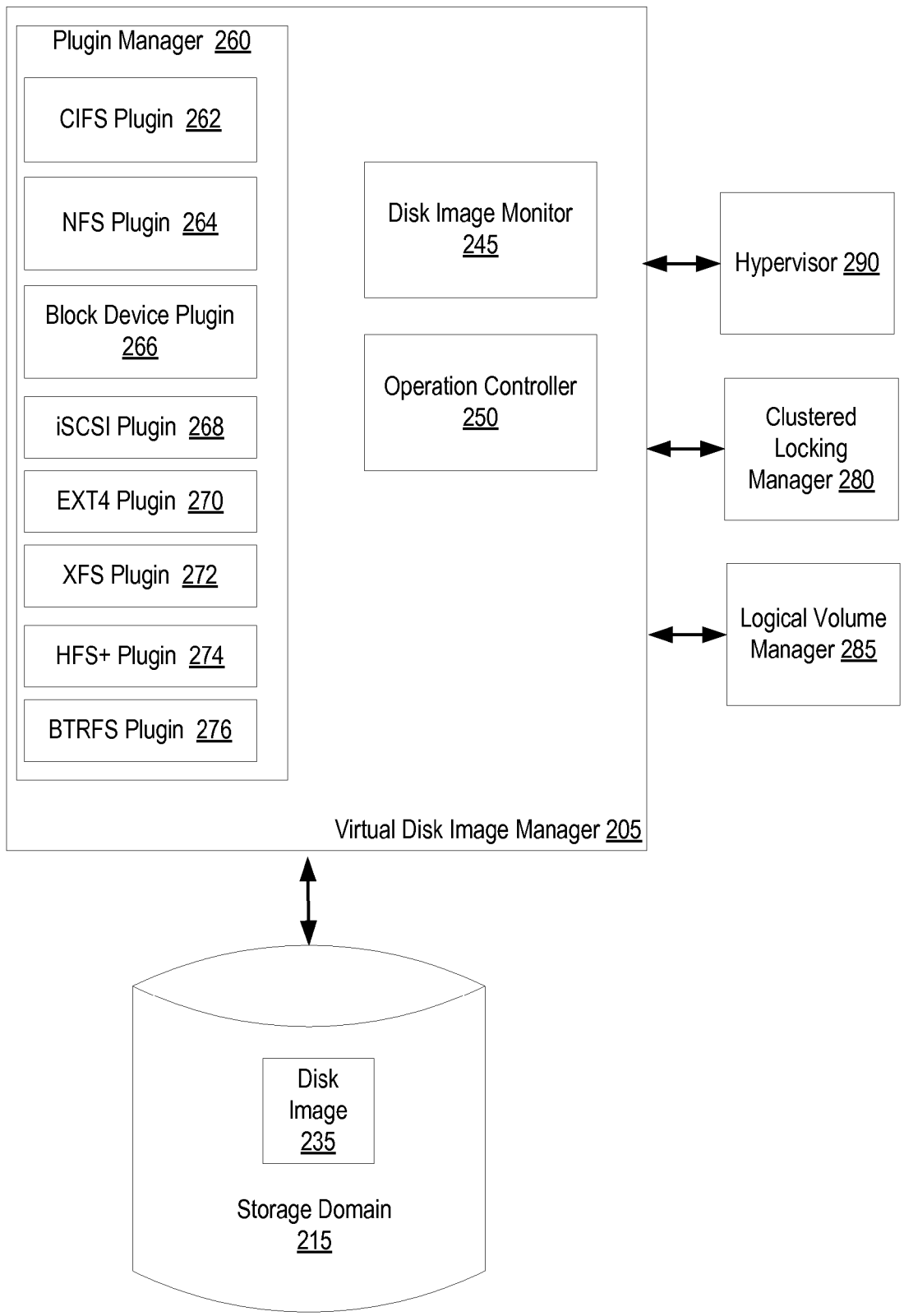
FIG. 2 is a block diagram of a virtual disk image manager, in accordance with one embodiment of present invention.

FIG. 2 is a block diagram of a virtual disk image manager 205, in accordance with one embodiment of present invention. In one embodiment, virtual disk image manager 205 corresponds to virtual disk image manager 145 of FIG. 1. In one embodiment, virtual disk image manager 205 includes a plugin manager 260, a disk image monitor 245, and an operation controller 250. Alternatively, the functionality of one or more of the plugin manager 260, disk image monitor 245 and operation controller 250 may be subdivided into multiple modules or may be combined into a single module.

Plugin manager 260 manages storage domain plugins. Plugin manager 260 may include any number of storage domain plugins. Each storage domain plugin may be configured to manage virtual disk images over a particular type of storage domain. For example, plugin manager 260 may include a CIFS plugin 262, NFS plugin 264, block device plugin 266, iSCSI plugin 268, EXT4 plugin 270, XFS plugin 272, HFS+ plugin 274, BTRFS plugin 276, and/or other storage domain plugin. In order to enable virtual disk image manager 205 to manage virtual disk images over a new type of storage domain, an administrator may simply install a new storage domain plugin associated with that new type of storage domain. Accordingly, as new file systems are developed (e.g., that might have improved performance for one or more functions such as write speed, read speed, clustered locking ability, etc.), new plugins for these new file systems may be added to virtual disk image manager 205. Existing disk images may then be migrated to new storage domains that use the new file systems.

Each storage domain plugin includes information identifying the capabilities of the particular type of storage domain that it is associated with. For example, the block device plugin 256 may indicate that a standard block device does not include native support for snapshots, clustered locking, sparse files, or thin provisioning. In contrast, the BTRFS plugin 276 may indicate that the BTRFS file system includes native support for all of these capabilities.

Virtual disk image manager 205 may connect a virtual machine to a disk image 235 in a storage domain 215 before, during or after instantiation of the virtual machine. In a clustered environment, in which multiple hosts may have access to a shared storage domain 215, it may be useful to perform clustered locking. Clustered locking ensures that a disk image that is being used by a first virtual machine will not be changed by a second virtual machine or host during the first machine's usage of that virtual disk image.

In one embodiment, operation determiner 250 queries the appropriate plugin associated with the storage domain 215 on which a particular disk image 235 is stored to determine whether that storage domain 215 supports clustered locking. If the storage domain does not support clustered locking, then operation determiner 250 loads a clustered locking manager 280, and requests an exclusive or shared lock on the disk image 235 from the clustered locking manager 280. The clustered locking manager 280 may then obtain a lock on the disk image 235 for the virtual machine, and report the lock to virtual disk image manager 205.

One example of a clustered locking manager 280 that may be used is SANlock. SANlock is a daemon that manages locks (also known as leases) for applications (e.g., virtual machines) running on a cluster of hosts with shared storage. SANlock performs lease management and coordination by reading and writing locks on the storage domain that is being shared. Other clustered locking managers may also be used. Virtual disk image manager 205 may instruct SANLock that a particular virtual machine requires a set of locks on one or more disk images 235. The virtual disk image manager 205 may instruct SANLock where to create a lock, what locks to create, how to initialize the locks, etc. SANLock may grant such locks, and may then monitor the state of the leases. SANLock can additionally track the liveness of the virtual machines, and release locks given to virtual machines that are no longer live.

In one embodiment, virtual disk image manager 205 is connected to a logical volume manager (LVM) 285, which may virtualize one or more underlying storage devices (e.g., block devices) and provide one or more logical volumes. Each logical volume may be a storage domain that is virtual and logically separated from an underlying physical storage device. Each logical volume may contain a single virtual disk image 235 or multiple disk images. The LVM 285 presents a logical view of a physical storage device to its host computer, and manages metadata that describes the locations of disk images 235, stored as data blocks, in the storage device. In one embodiment, LVM 285 dynamically maps and binds logical data blocks into physical data blocks, and vice versa.

The LVM 285 also resolves logical block numbers into physical block numbers, and vice versa. With dynamic mapping between logical and physical storage space, any guest file systems used to format the disk images 154, 156 can work with logical partitions of the disk images without the knowledge of disk boundaries. Unlike a physical partition on a disk, a logical partition can span across multiple disks and can be resized as necessary. Thus, a partition can be expanded when it starts to fill up.

With the logical partitioning of the storage device, each disk image 154, 156 can be allocated with storage in a volume that is sparse or thin provisioned. A "volume" is a set of stored data associated with a collection of mass storage devices, such as disks. A volume may store data in the form of data blocks, and is managed as an independent administrative unit. A thin provisioned volume has a minimal amount of allocated disk space, and can have unallocated disk space. A sparse volume is a volume having at least a location that is reserved for storing data contents, but has not been allocated actual storage. Sparseness is the ability to write in arbitrary offsets without needing to fill up intervening blocks. The virtual disk image manager may instruct the LVM to extend the size of a logical volume whenever it determines that the a virtual disk image associated with that logical volume is too small.

Once the virtual machine is connected to the disk image 235, it may perform I/O operations to the disk image 235, which the storage domain 215 may translate into I/O operations on underlying storage. In one embodiment, disk image monitor 245 monitors the virtual disk image 235 (e.g., while the virtual machine is connected to it) and an associated virtual machine. Disk image monitor 245 may monitor, for example, a current locking state on the disk image, an amount of free storage space on the disk image 235, errors associated with storage, I/O operations requested by the VM, and so on. If the disk image monitor 245 determines that the disk image 235 is nearly full (e.g., all of the storage space that has been allotted to the disk image has been filled up with data), then disk image monitor 245 may report this state to operation controller 250. For example, if disk image monitor 245 determines that an amount of available space for the disk image reaches a threshold (e.g., a 90% full threshold, a 10 MB remaining threshold or other threshold), it may report this to operation determiner 250.

Operation determiner 250 may query the appropriate plugin to determine whether the storage domain 215 has thin provisioning capabilities. If so, then the storage domain 215 will automatically grow a size of the disk image. However, if the storage domain does not support thing provisioning, the disk image 235 may run out of space. Accordingly, operation controller 250 may send a command to the storage domain 215 instructing it to increase a size of the disk image 235. If the LVM 285 is managing logical volumes on the storage domain 215, then operation controller 250 may instruct the LVM 285 to increase the size of a logical volume associated with the disk image 235.

Note that disk image monitor 245 may also detect that a disk image should be grown in response to detecting that a virtual machine has attempted to write beyond or close to the end of a file (e.g., upon detection of an e-no space error). An e-no space error may cause the virtual machine to be paused due to lack of storage space. Operation determiner 250 may grow the size of the virtual machine, and may then instruct a hypervisor to resume the virtual machine.

In one embodiment, when a disk image 235 is created on, moved to, or copied to a storage domain 215, operation determiner 250 determines whether that storage domain supports sparse files, copy-on-write operations and/or snapshots. If the storage domain 215 does not support some or all of these capabilities, then operation determiner 250 causes the disk image 235 to have a specific file type or object type that itself supports sparseness, copy-one-write operations and/or snapshots. One example of a disk image format that provides these capabilities is the QEMU copy-on-write (QCOW) disk image format. Operation determiner 250 may then report to the hypervisor 290 that the disk image 235 has the specific file type or object type.

A QCOW image is a type of disk image that uses optimization strategies to delay allocation of storage until it is actually needed. A QCOW image grows as data is added, and supports advanced encryption system (AES) encryption, COW functionality, snapshots and/or transparent decompression. Each QCOW image includes one or more tables that identify what offsets in the storage domain 215 map to what offsets within the image. The QCOW image can effectively grow like a sparse file simply by writing data to the storage domain 215 and adding an entry for that data to the tables in the QCOW image.

QCOW formatted disk images also support copy-on-write functionality. Each QCOW file may include in a header a pointer to another QCOW disk image that the QCOW image relies upon. Accordingly, a QCOW image can be used to store the changes to another disk image, without actually affecting the contents of the original image. The image, known as a copy-on-write image, looks like a standalone image to the user, but most of its data is obtained from the original image. Only the blocks of data that differ from the original image may be stored in the copy-on-write image file itself. The copy-on-write image contains the path to the original disk image, and an image header gives the location of the path string within the file or object. When a hypervisor is to read from the copy-on-write image, it may first check to see if a specific area being read is allocated within the copy-on-write image. If not, then the hypervisor reads the area from the original disk image.

The QCOW image format additionally supports snapshots. Snapshots are a similar notion to the copy-on-write feature, except it is the original image that is writable, not the snapshots. Each snapshot is a read-only record of the disk image at a particular point in time. The original disk image remains writable and as modifications are made to it, a copy of the original data is made for any snapshots referring to it.

In an example, assume that a new disk image is to be created on top of the BTRFS file system. Virtual disk image manager 205 creates a new empty file in the file system. The virtual disk image is exposed to a guest machine, which views it as a disk. An administrator runs an operating system installation, and all the bits are written to this file. Some applications are installed, and all the bits are written to this file. Then at some point, the administrator wants to create a new disk image for a new virtual machine, and wants it to be based on the first disk image. The virtual disk image manager 205 determines from the BTRFS plugin 276 that the file system supports snapshots, and so instructs the BTRFS file system to create a clone or snapshot of this disk image. The newly generated snapshot would be a new disk image that depends on the original image. BTRFS makes sure that the new disk image is deduped behind the scene.

Continuing the example, say the administrator wants to create another disk image for a virtual machine from this disk image, but the storage that will be used is on another file system. Virtual disk image manager 235 would clone the disk image (actually copy all the bits over to the new file system) since these are two different storage domains. Say the virtual disk image manager 205 determines based on a plugin for the new file system that the target storage doesn't support snapshots. Accordingly, the virtual disk image manager may format the copy in the new file system such that it has the QCOW image format. Then if the administrator wants to create a new disk image on that same new storage from the recently cloned image, the virtual disk image manager 205 would generate a QCOW snapshot.

Figure 3:
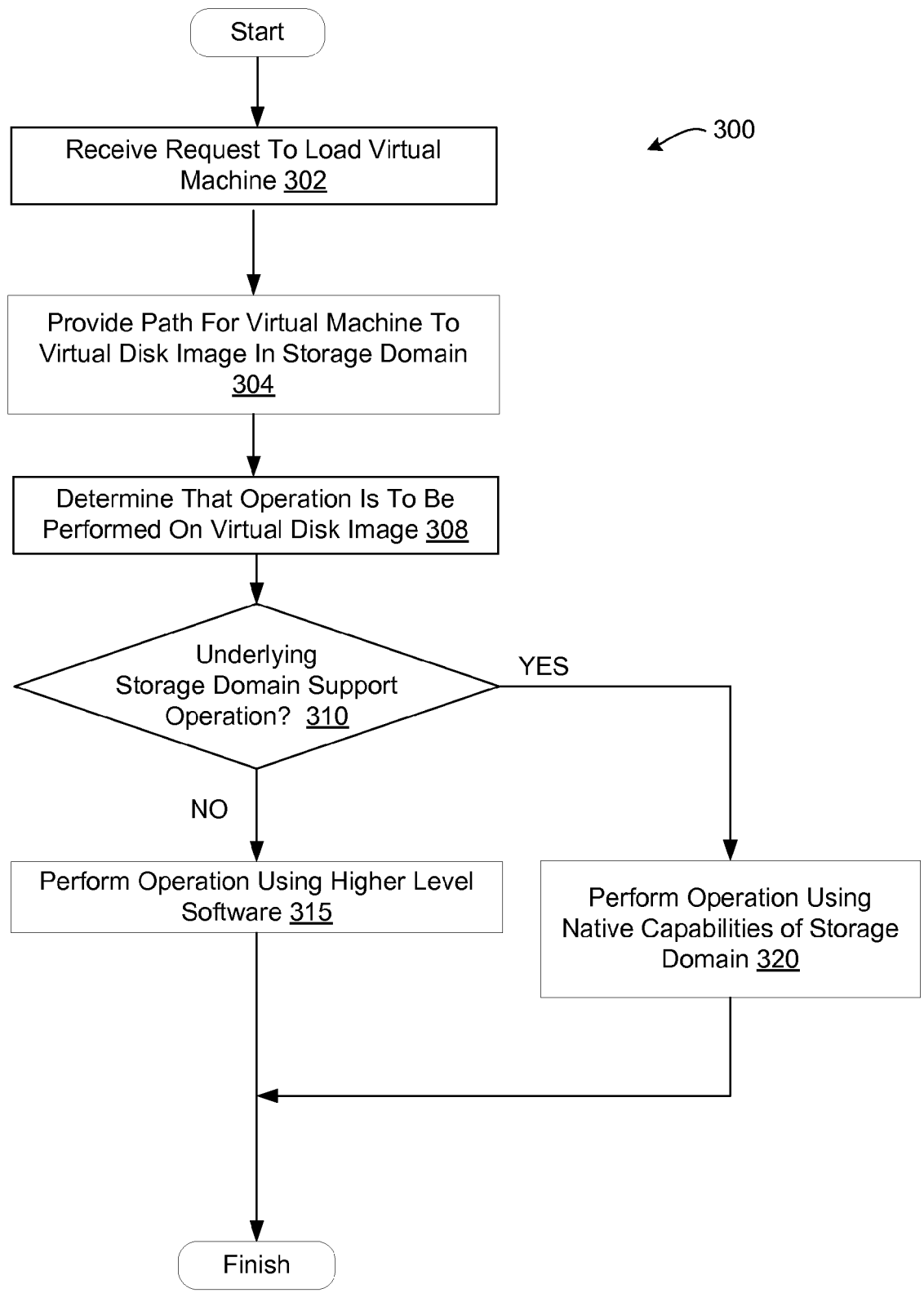
FIG. 3 is a flow diagram illustrating one embodiment of a method for managing operations on virtual disk images.

FIG. 3 is a flow diagram illustrating one embodiment of a method 300 for managing operations on virtual disk images. The method 300 may be performed by a computer system that may comprise hardware (e.g., circuitry, dedicated logic, programmable logic, microcode, etc.), software (e.g., instructions run on a processing device to perform hardware simulation), or a combination thereof. In one embodiment, at least some operations of the method 300 are performed by the virtual disk image manager 205 of FIG. 2.

At block 302 of method 300, processing logic receives a request to load a virtual machine. At block 304, processing logic provides a path to the virtual disk image in a particular storage domain. The storage domain may be a block storage device or a file system. This path may be provided to a hypervisor, which may load a virtual machine based on the disk image. The virtual machine may be connected to the disk image, and may read from and write to the connected disk image.

At block 308, processing logic determines that an operation is to be performed on a virtual disk image. In one embodiment, a hypervisor attempts to perform the operation on the disk image. The operation may to create a new disk image, copy the virtual disk image, delete the disk image, move the disk image, generate a snapshot of the disk image, perform a copy-on-write operation on the disk image, migrate the disk image to a new backend data store, or any other type of data operation. Processing logic may intercept the attempt. In another embodiment, processing logic may monitor the virtual machine and/or its associated disk image. If the virtual machine and/or disk image satisfy a criteria for performing an operation (e.g., the disk image is nearly full), then processing logic may determine that the operation should be performed.

At block 310, processing logic determines whether the underlying storage domain for the virtual disk image supports the determined operation. This may be determined by querying a storage domain plugin associated with the underlying storage domain. The storage domain plugin may specify which capabilities are supported by the storage domain. If the storage domain natively supports the determined operation, the method continues to block 320, and processing logic performs the determined operation using the native capabilities of the storage domain. If the storage domain does not support the operation, then processing logic performs the operation using higher level software. For example, processing logic may launch and/or query one or more applications (e.g., SANLock, LVM, etc.) that may perform the operation. If processing logic is a virtual disk image manager, then processing logic may perform the determined operations. The method then ends.

Figure 4:
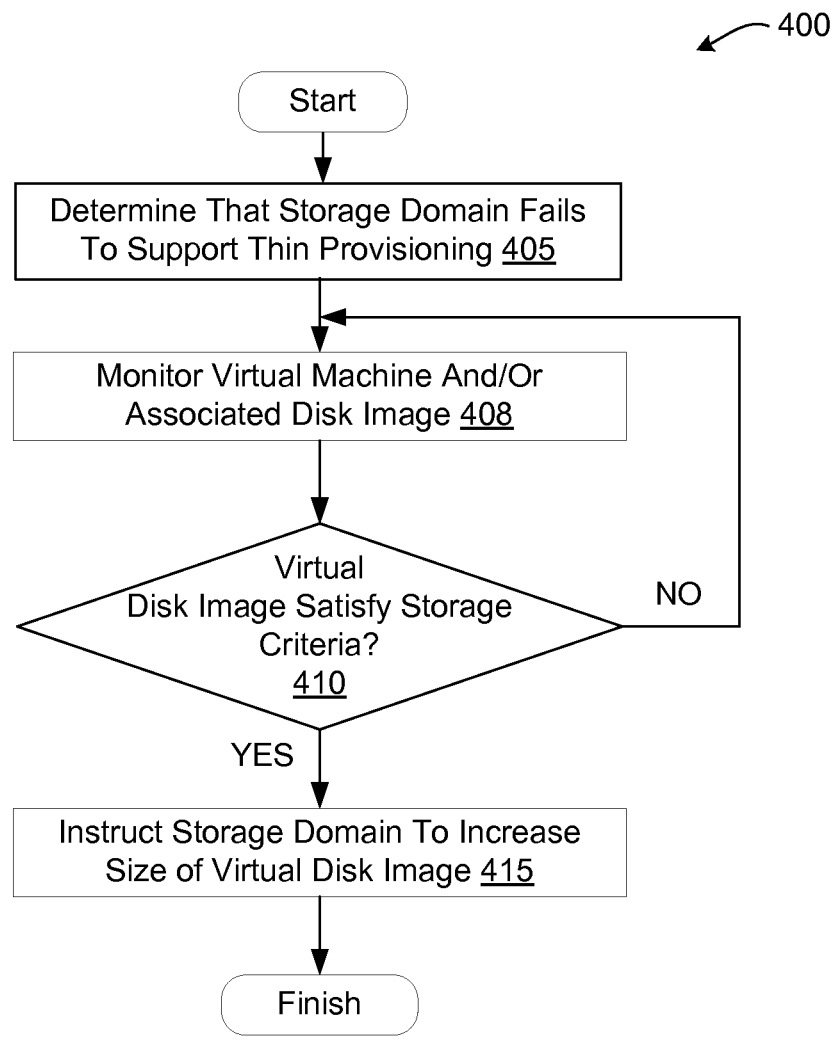
FIG. 4 is a flow diagram illustrating one embodiment of a method for performing thin provisioning operations for a virtual disk image that is stored on a storage domain that does not support thin provisioning.
Figure 5:
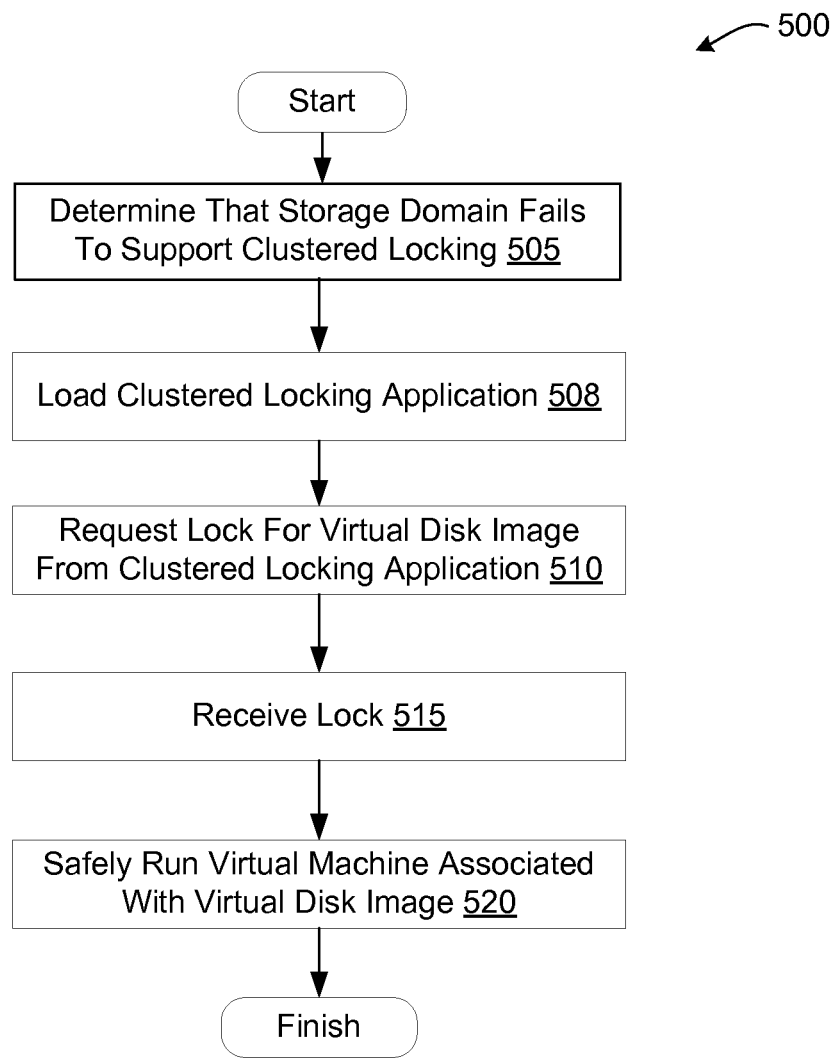
FIG. 5 is a flow diagram illustrating one embodiment of a method for performing clustered locking operations for a virtual disk image that is stored on a storage domain that does not support clustered locking.
Figure 6:
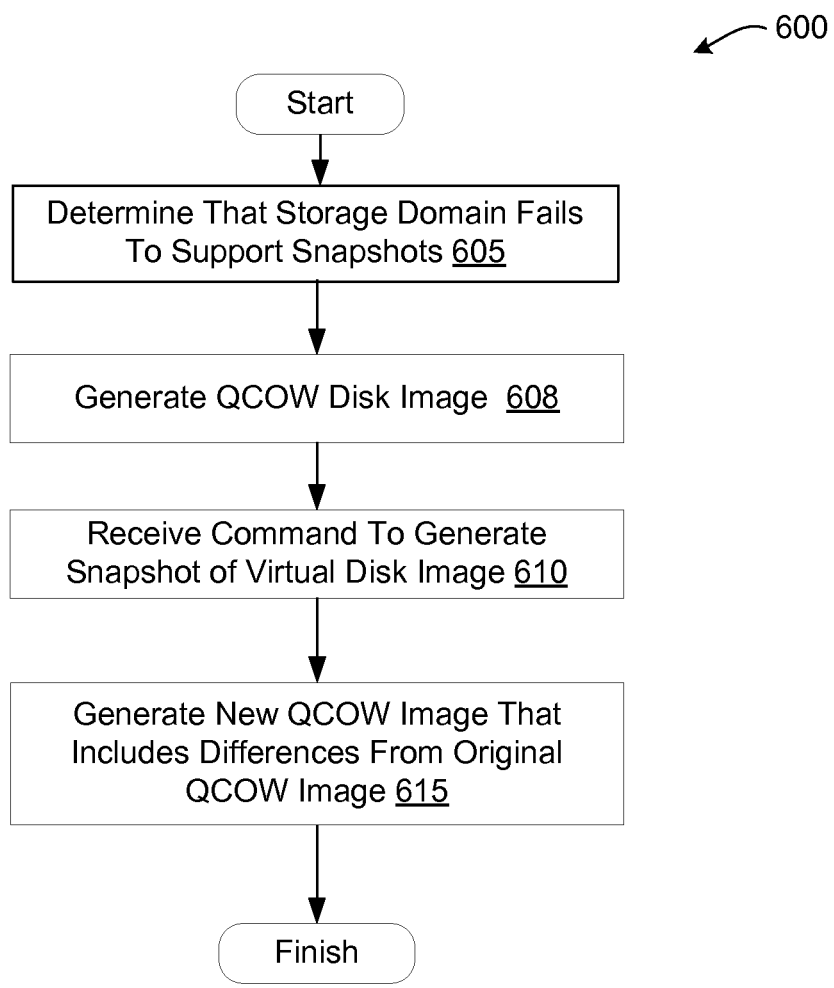
FIG. 6 is a flow diagram illustrating one embodiment of a method for performing snapshot operations for a virtual disk image that is stored on a storage domain that does not support snapshots.

FIGS. 4-6 are flow diagrams showing various methods for a virtual image disk manager performing operations that are unsupported by an underlying backend data store (storage domain). The methods may be performed by a computer system that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by the virtual disk image manager 205 of FIG. 2.

FIG. 4 is a flow diagram illustrating one embodiment of a method for performing thin provisioning operations for a virtual disk image that is stored on a storage domain that does not support thin provisioning. At block 405 of method 400, processing logic determines that a storage domain that stores a virtual disk image fails to support thin provisioning. At block 408, processing logic monitors the virtual disk image and/or a virtual machine associated with the virtual disk image. At block 410, processing logic determines whether the virtual disk image satisfies one or more criteria. The criteria may be one or more storage space thresholds. If the amount of used storage space exceeds any of the thresholds, then the storage criteria may be satisfied, at which point the method continues to block 415. The criteria may also include detection of particular errors such as an e-no space error, which may be generated when a virtual machine attempts to write outside of the boundaries of its disk image. Otherwise, the method returns to block 408. At block 415, processing logic instructs the storage domain to increase a size of the virtual disk image. The method then ends. If the satisfied criteria was a detected error message, then the virtual machine may have been paused. Accordingly, processing logic may instruct a hypervisor to resume the virtual machine after the size of the disk image has been increased.

FIG. 5 is a flow diagram illustrating one embodiment of a method for performing clustered locking operations for a virtual disk image that is stored on a storage domain that does not support clustered locking. At block 505 of method 500, processing logic determines that a storage domain fails to support clustered locking. At block 508, processing logic loads a clustered locking application such as SANLock (unless the clustered locking application is already running). At block 510, processing logic requests a lock for a virtual disk image from the clustered locking application. The virtual disk image may actually be a collection of linked virtual disk images that may depend on one another. In such an instance, processing logic may request locks to each of the virtual disk images. At block 515, the clustered locking application obtains a lock for the virtual machine on the disk image or images. At block 520, processing logic safely runs the virtual machine associated with the virtual disk image or images.

When the virtual machine is shut down, processing logic may request that the clustered locking application release the locks. The clustered locking application may then release the locks, freeing the virtual disk images for use by other virtual machines.

Note that processing logic may receive a request to read from or to write to the disk image (or disk images) while they are leased to the virtual machine. In such an instance, processing logic would send a request for a lock to the clustered locking application. The clustered locking application would return a failure response to processing logic. Processing logic would then report the failure to the requestor. Note also that in alternative embodiments, the functionality of the clustered locking application may be incorporated into the processing logic (e.g., into a virtual disk image manager).

FIG. 6 is a flow diagram illustrating one embodiment of a method for performing snapshot operations for a virtual disk image that is stored on a storage domain that does not support snapshots. At block 605 of method 600, processing logic determines that a storage domain fails to support snapshots. At block 608, processing logic generates a QCOW formatted disk image. At block 610, processing logic receives a command to generate a snapshot of the QCOW disk image. At block 615, processing logic generates a new QCOW disk image that depends on the original QCOW disk image and includes differences between the original QCOW image and the current QCOW image. The method then ends.

Figure 7:
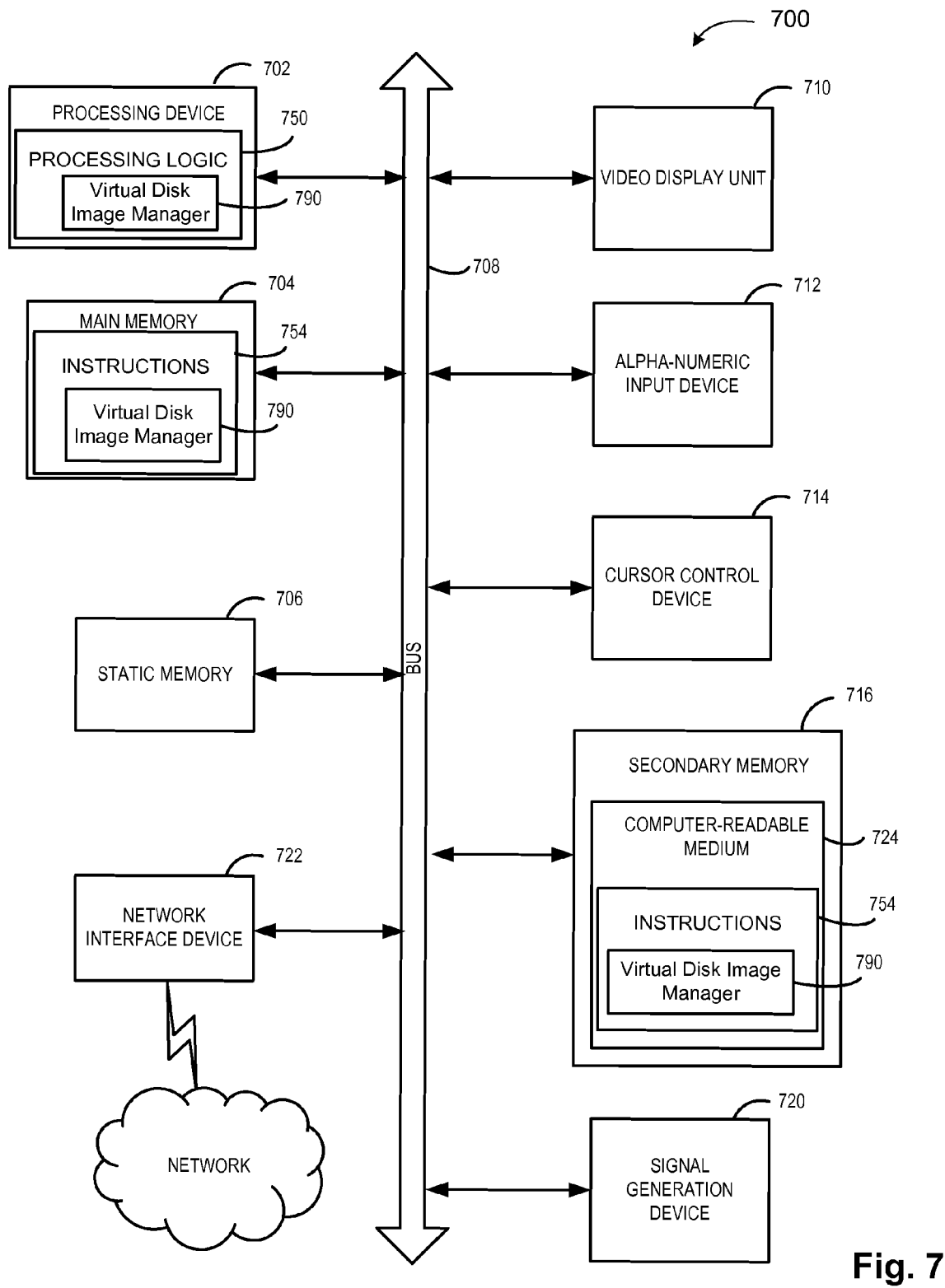
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. The computer system 700 may correspond to host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 708.

The processing device 702 represents one or more general-purpose processors such as a microprocessor, central processing unit, or the like. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions 754 embodying any one or more of the methodologies or functions described herein (e.g., virtual disk image manager 790, which may correspond to virtual disk image manger 205 of FIG. 2). The instructions 754 may also reside, completely or at least partially, within the main memory 704 and/or within the processing device 702 during execution thereof by the computer system 700; the main memory 704 and the processing device 702 also constituting machine-readable storage media.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions presented above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "using", "identifying", "determining", "sending", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable read only memories (EPROMs), electronically erasable programmable read only memories (EEPROMs), magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    determining, by a virtual disk image manager running on a processing device, that an operation is to be performed on a virtual disk image, wherein the operation comprises a thin provisioning operation;
    determining, by the virtual disk image manager, whether an underlying storage domain on which the virtual disk image is stored supports the operation;
    in response to determining that the storage domain supports the operation, using native capabilities of the storage domain to perform the operation; and
    in response to determining that the storage domain does not support the operation, performing, using the processing device, the operation by the virtual disk image manager, wherein determining that the storage domain does not support the operation comprises determining that the storage domain fails to support thin provisioning.

2. The method of claim 1, wherein the storage domain comprises a block device.

3. The method of claim 1, wherein the storage domain comprises a file system.

4. The method of claim 1, wherein the virtual disk image manager includes a first storage plugin that enables the virtual disk image manager to manage virtual disk images stored on the storage domain and a second storage plugin that enables the virtual disk image manager to manage virtual disk images stored on an additional storage domain that is different from the storage domain.

5. The method of claim 4, further comprising:
    receiving, by the virtual disk image manager, a command to perform an additional operation on an additional virtual disk image that is stored on the additional storage domain; and
    using the second storage plugin to determine whether to use native capabilities of the additional storage domain to perform the additional operation or to perform the additional operation by the virtual disk image manager.

6. The method of claim 1, wherein the operation is a snapshot operation, and wherein determining that the operation is to be performed is performed in response to receiving a command to perform the snapshot operation from a hypervisor.

7. The method of claim 1, wherein the thin provisioning thin provisioning operation comprises allocating an amount of storage space to the virtual disk image, and wherein performing the operation by the virtual disk image manager comprises:
    monitoring the virtual disk image;
    making a determination that a threshold amount of allotted storage space has been used up by the virtual disk image; and
    instructing the storage domain to increase a size of the virtual disk image in response to making the determination.

8. The method of claim 1, wherein the storage domain fails to support at least one of snapshots, sparse files, thin provisioning or clustered locking, and wherein the virtual disk image manager adds capabilities for any of snapshots, sparse files, thing provisioning or clustered locking that are not supported by the storage domain.

9. A non-transitory computer readable storage medium having instructions that, when executed by a processing device, cause the processing device to:
    determine, by a virtual disk image manager running on the processing device, that an operation is to be performed on a virtual disk image, wherein the operation comprises a thin provisioning operation;
    determine, by the virtual disk image manager, whether an underlying storage domain on which the virtual disk image is stored supports the operation;
    in response to determining that the storage domain supports the operation, use native capabilities of the storage domain to perform the operation; and
    in response to determining that the storage domain does not support the operation, perform, using the processing device, the operation without the use of the native capabilities of the storage domain, wherein determining that the storage domain does not support the operation comprises determining that the storage domain fails to support thin provisioning.

10. The non-transitory computer readable storage medium of claim 9, wherein the storage domain comprises a block device.

11. The non-transitory computer readable storage medium of claim 9, wherein the storage domain comprises a file system.

12. The non-transitory computer readable storage medium of claim 9, wherein the virtual disk image manager includes a first storage plugin that enables the virtual disk image manager to manage virtual disk images stored on the storage domain and a second storage plugin that enables the virtual disk image manager to manage virtual disk images stored on an additional storage domain that is different from the storage domain.

13. The non-transitory computer readable storage medium of claim 12, wherein the processing device is further to:
    receive, by the virtual disk image manager, a command to perform an additional operation on an additional virtual disk image that is stored on the additional storage domain; and
    use the second storage plugin to determine whether to use native capabilities of the additional storage domain to perform the additional operation or to perform the additional operation by the virtual disk image manager.

14. The non-transitory computer readable storage medium of claim 9, wherein the operation comprises a snapshot operation, and wherein the processing device is further to determine that the operation is to be performed in response to receiving a command to perform the snapshot operation from a hypervisor.

15. The non-transitory computer readable storage medium of claim 9, wherein the thin provisioning operation comprises allocating an amount of storage space to the virtual disk image, and wherein the processing device is further to:
monitor the virtual disk image;
make a determination that a threshold amount of allotted storage space has been used up by the virtual disk image; and
instruct the storage domain to increase a size of the virtual disk image in response to making the determination.

16. The non-transitory computer readable storage medium of claim 9, wherein the storage domain fails to support at least one of snapshots, sparse files, thin provisioning or clustered locking, and wherein the virtual disk image manager adds capabilities for any of snapshots, sparse files, thing provisioning or clustered locking that are not supported by the storage domain.

17. An apparatus comprising:
a memory; and
a processing device operatively coupled to the memory, wherein the processing device is to:
determine that an operation is to be performed on a virtual disk image, wherein the operation comprises a thin provisioning operation;
determine whether an underlying storage domain on which the virtual disk image is stored supports the operation;
use native capabilities of the storage domain to perform the operation in response to determining that the storage domain supports the operation; and
perform the operation without the use of the native capabilities of the storage domain in response to determining that the storage domain does not support the operation, wherein determining that the storage domain does not support the operation comprises determining that the storage domain fails to support thin provisioning.

18. The apparatus of claim 17, wherein the storage domain comprises one of a block device or a file system, and wherein the thin provisioning operation comprises allocating an amount of storage space to the virtual disk image.

19. The apparatus of claim 17, wherein the virtual disk image manager includes a first storage plugin that enables the virtual disk image manager to manage virtual disk images stored on the storage domain and a second storage plugin that enables the virtual disk image manager to manage virtual disk images stored on an additional storage domain that is different from the storage domain.

20. The apparatus of claim 19, wherein the processing device is further to:
receive a command to perform an additional operation on an additional virtual disk image that is stored on the additional storage domain; and
use the second storage plugin to determine whether to use native capabilities of the additional storage domain to perform the additional operation or to perform the additional operation by the virtual disk image manager.

\* \* \* \* \*